United States Patent
Ren

(10) Patent No.: US 7,272,097 B2
(45) Date of Patent: Sep. 18, 2007

(54) METHOD OF DETECTING DATA STRUCTURE OF NON-RETURN-TO-ZERO DATA IN AN OPTICAL STORAGE DEVICE

(75) Inventor: Tsung-Huei Ren, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 513 days.

(21) Appl. No.: 10/707,460

(22) Filed: Dec. 16, 2003

(65) Prior Publication Data

US 2005/0068875 A1 Mar. 31, 2005

(30) Foreign Application Priority Data

Sep. 29, 2003 (TW) .................... 92126902

(51) Int. Cl.
*G11B 7/005* (2006.01)
(52) U.S. Cl. ................. 369/59.23; 369/59.24; 369/59.25; 369/59.26
(58) Field of Classification Search ............ 369/59.23, 369/59.24, 59.25, 59.26
See application file for complete search history.

(56) References Cited

U.S. PATENT DOCUMENTS

| 4,634,952 | A | * | 1/1987 | Yoshino et al. ............. 318/811 |
| 5,077,721 | A | * | 12/1991 | Sako et al. ............... 369/59.26 |
| 5,375,249 | A | * | 12/1994 | Cho ........................ 369/59.23 |
| 5,638,064 | A | * | 6/1997 | Mori et al. .................... 341/58 |
| 5,748,119 | A | * | 5/1998 | Ko ............................... 341/59 |
| 5,774,078 | A | * | 6/1998 | Tanaka et al. ................ 341/68 |
| 6,268,810 | B1 | * | 7/2001 | Shim et al. ................... 341/59 |
| 2004/0047279 | A1 | * | 3/2004 | Nakamura et al. ....... 369/275.3 |

* cited by examiner

*Primary Examiner*—Wayne Young
*Assistant Examiner*—Linh T. Nguyen
(74) *Attorney, Agent, or Firm*—Winston Hsu

(57) ABSTRACT

A method of detecting a data structure of fourteen-bit data in an optical storage device includes connecting a first 8-bit register between an eight-to-fourteen modulator and a leading zero counter, storing 8 least significant bits of the data output from the eight-to-fourteen modulator into the first 8-bit register, and calculating the number of leading zeros with the leading zero counter.

24 Claims, 2 Drawing Sheets

METHOD OF DETECTING DATA STRUCTURE OF NON-RETURN-TO-ZERO DATA IN AN OPTICAL STORAGE DEVICE

BACKGROUND OF INVENTION

1. Field of the Invention

The present invention relates to a method of detecting a data structure of data in an optical storage device, and more particularly, to a method of obtaining leading zeros and trailing zeros from fourteen-bit data.

2. Description of the Prior Art

In the prior rewritable optical recording system, 8-bit symbol data should be encoded in non-return-to-zero (NRZ) format and be transformed into 14-bit channel bit data, the two steps together being called eight-to-fourteen-modulation. According to the Red Book, when the data "0" appears in a data stream of 14 bits, the run-length of "0" is limited to shorter than 11T and longer than 3T, this being called run-length rule. The run-length is limited to maintain the linear speed of the compact disc according to the data stream of 14 bits. 3T represents a 720 KHz signal with the linear speed 1.2 m/s and 11T represents a 196 KHz signal with the linear speed 1.2 m/s, with any signal out of the standard timing being regarded as an error message.

In addition, the digital sum value is generated by the NRZ of the 14 bits. This helps the average potential of the NRZ of the 14 bits to be close to the DC potential. According to the Red Book, three merging bits must be inserted into any two data streams of 14 bits for complying with the run-length rule and for keeping the average potential of the NRZ of the 14 bits near the DC potential. The ideal merging bits are calculated after getting the leading and trailing zeros of the two data streams of 14 bits.

The prior art requires two memories or registers to record the former 14 bits and the latter 14 bits, inputting the data of the two registers into a corresponding leading zero counter and a corresponding trailing zero counter to count the number of the leading and trailing zeros, respectively. However, this requires more memory and a complex decoding circuit, and thus, requires improvement.

SUMMARY OF INVENTION

It is therefore a primary objective of the claimed invention to provide a method of detecting a data structure of data in an optical storage device to solve the above-mentioned problem.

The claimed invention method of detecting a data structure of data in an optical storage device includes providing a first 8-bit register connected between an eight-to-fourteen modulator and a leading zero counter, storing the first eight bits of the data output from the eight-to-fourteen modulator into the first 8-bit register, and calculating the number of leading zeros stored in the first 8-bit register with the leading zero counter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
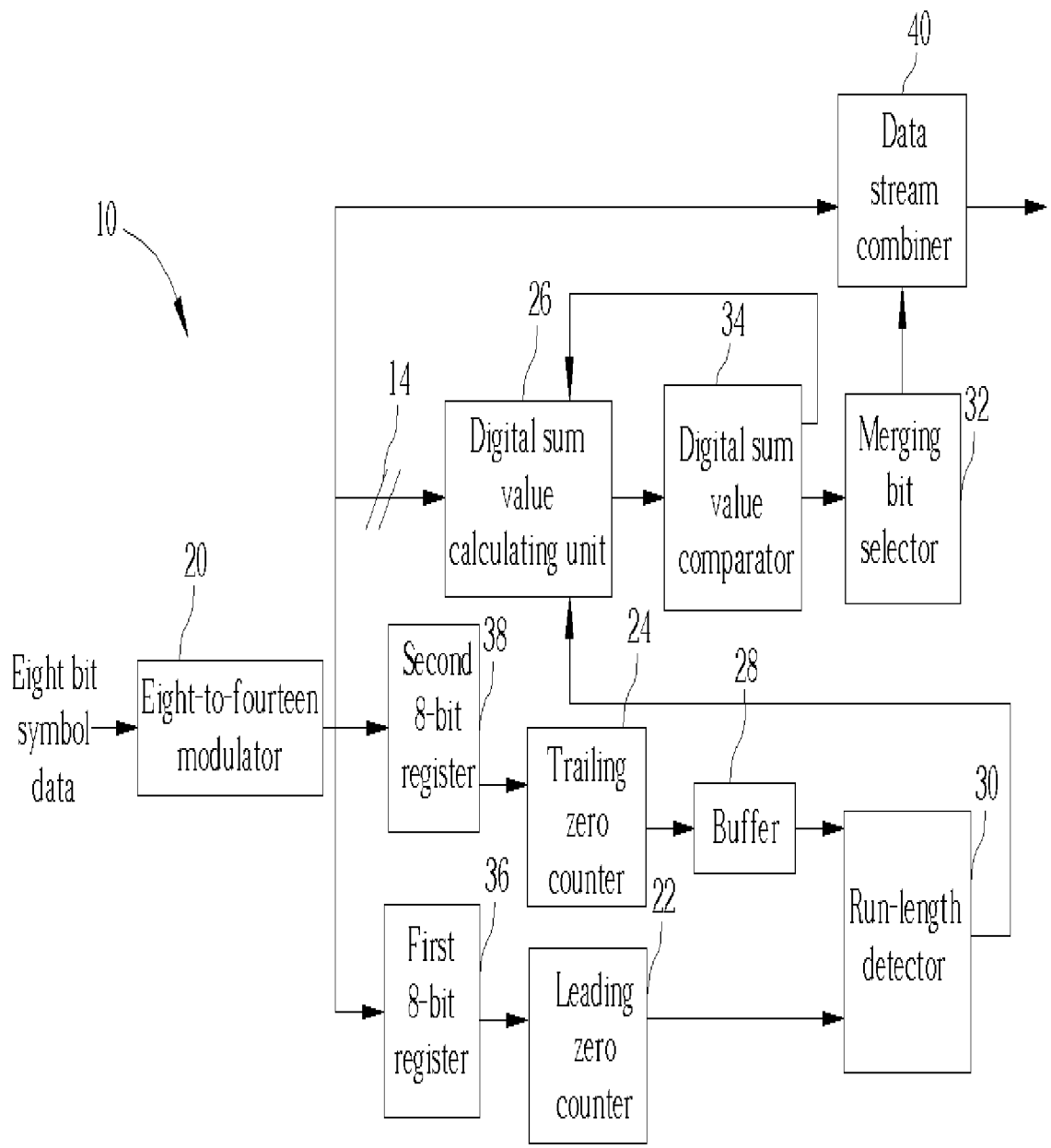
FIG. 1 is a block diagram of an optical recording system according to the present invention.

Please refer to FIG. 1. FIG. 1 is a block diagram of an optical recording system 10 according to the present invention. The optical recording system 10 comprises an eight-to-fourteen modulator 20, a leading zero counter 22, a trailing zero counter 24, a digital sum value calculating unit 26, a buffer 28, a digital sum value comparator 34, a data stream combiner 40, and a merging bit selector 32. The eight-to-fourteen modulator 20 is connected to the digital sum value calculating unit 26, the second 8-bit register 38, the first 8-bit register 36, and the data stream combiner 40. The run-length detector 30 is connected to the digital sum value calculating unit 26. The second 8-bit register 38 and the first 8-bit register 36 are respectively connected to the trailing zero counter 24 and the leading zero counter 22.

The data captured by an optical pick-up head is first forwarded to the eight-to-fourteen modulator 20, the eight-to-fourteen modulator 20 transforming the 8-bit input into 14-bit NRZ data, the NRZ coding being prescribed in the Red Book as previously described. The 14-bit data is separately input into the digital sum value calculating unit 26 and the data stream combiner 40, at the same time, the 8 most significant bits of the 14-bit data are input into the second 8-bit register 38 and the 8 least significant bits of the 14-bit data are input into the first 8-bit register 36. The trailing zero counter 24 detects the number of trailing zeros of the 8 least significant bits stored in the second 8-bit register 38, and further detects the number of trailing zeros of the 8 most significant bits stored in the second 8-bit register 38 if the 8 least significant bits stored in the second 8-bit register 38 are zeros. The leading zero counter 22 detects the number of leading zeros of the 8 least significant bits stored in the first 8-bit register 36, and further detects the number of leading zeros of the 8 most significant bits stored in the first 8-bit register 36 if the 8 least significant bits stored in the first 8-bit register 36 are zeros. According to 14-bit data of the 256 combinations in the Red Book, the number of leading zeros and the number of trailing zeros never exceed 8 under any condition. Therefore, the numbers of the leading and trailing zeros are generated by detecting the 8 least and most significant bits in the present invention for generating the merging bits. The first 8-bit register 36 and the second 8-bit register 38 mentioned above can be replaced with a single 8-bit register using a different clock to access the data.

Due to the sequence of the data, the trailing zero data from the trailing zero counter 24 must first be input into the buffer 28 so that the number of trailing zeros and the number of leading zeros of the next 14-bit data are input into the run-length detector 30 simultaneously. The run-length detector 30 detects whether the input data complies with the run-length rule according to the numbers of leading zeros and trailing zeros, the run-length being longer than three periods (3T) and less than eleven periods (11T). The output of the run-length detector 30 is immediately input into the digital sum value calculating unit 26 to begin the merging bit operation. The digital sum value calculating unit 26 processes the 14-bit data directly input into it and then generates a signal to the merging bit selector 32 for controlling the final merging bit generated by the merging bit selector 32 according to the output of the run-length detector 30. The data stream combiner 40 accesses the stored former and latter 14-bit data and then inserts the merging bit generated by the merging bit selector 32 between these two data.

Figure 2:
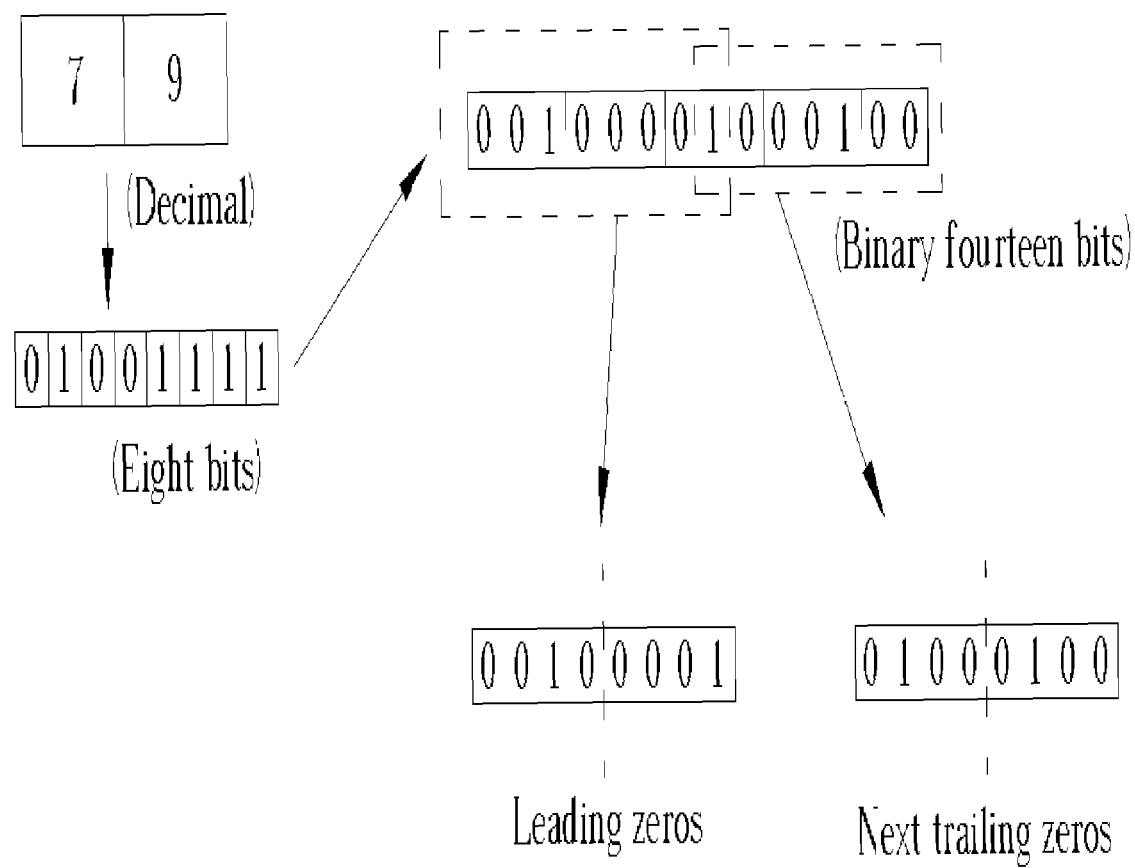
FIG. 2 is a schematic diagram of a data process according to the present invention.

Please refer to FIG. 2. FIG. 2 is a schematic diagram of the data process in the present invention. In FIG. 2, the decimal number "79" is transformed into an 8-bit binary number "01001111". The 8-bit "01001111" is transformed into a 14-bit "00100001000100" by the eight-to-fourteen modulator 20, the 14-bit data immediately being input into the digital sum value calculating unit 26 and the data stream combiner 40. The 8 least significant bits "00100001" are input into the first 8-bit register 36 while the 8 most significant bits "01000100" are input into the second 8-bit register 38. The trailing zero counter 24 accesses the data stored in the second 8-bit register 38 and counts the number of trailing zeros. The number of trailing zeros is "2", counting from the most significant bit to the least significant bit until "1" appears, and thus the "2" generated by the trailing zero counter 24 is immediately stored in the buffer 28. The leading zero counter 22 accesses the data stored in the first 8-bit register 36 and counts the number of leading zeros. The number of the leading zeros is "2", counting from the least significant bit to the most significant bit until "1" appears, and thus the "2" generated by the leading zero counter 22 is immediately stored in the run-length detector 30.

Compared to the prior art, the numbers of leading and trailing zeros are generated by counting the 8 least significant bits and the 8 most significant bits of the 14-bit data and then detecting if it complies with the run-length rule. This saves more memory than recording two data stream of 14 bits.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of processing recovered data in an optical storage device, the method comprising:
   providing a first 8-bit register connected between an eight-to-fourteen modulator and a leading zero counter;
   storing the 8 least significant bits of data output from the eight-to-fourteen modulator in the first 8-bit register;
   calculating a number of leading zeros stored in the first 8-bit register with the leading zero counter;
   generating merging bits according to the number of leading zeros to thereby keep an average potential of the bits of data output from the eight-to-fourteen modulator near a DC potential;
   inserting the generated merging bits between former 14-bit data and latter 14-bit data; and
   utilizing the optical storage device to write the former 14-bit data, the inserted merging bits, and the latter 14-bit data to the optical disc.

2. The method of claim 1 further comprising:
   detecting the number of leading zeros of the least significant bits stored in the first 8-bit register, if the least significant bits stored in the first 8-bit register are zeros; and further detecting the number of leading zeros of the most significant bits stored in the first 8-bit register.

3. The method of claim 1 further comprising:
   providing a second 8-bit register connected between the eight-to-fourteen modulator and a trailing zero counter;
   storing the 8 most significant bits of the data output from the eight-to-fourteen modulator in the second 8-bit register; and
   calculating a number of trailing zeros stored in the second 8-bit register with the trailing zero counter.

4. The method of claim 3 further comprising:
   detecting the number of trailing zeros of the most significant bits stored in the second 8-bit register, if the most significant bits stored in the second 8-bit register are zeros; and further detecting the number of trailing zeros of the least significant bits stored in the first 8-bit register.

5. The method of claim 1 further comprising:
   connecting the first 8-bit register between the eight-to-fourteen modulator and a trailing zero counter;
   storing the 8 most significant bits of the data output from the eight-to-fourteen modulator in the first 8-bit register; and
   calculating a number of trailing zeros stored in the first 8-bit register with the trailing zero counter.

6. The method of claim 5 further comprising:
   detecting the number of trailing zeros of the most significant bits stored in the first 8-bit register, if the most significant bits stored in the first 8-bit register are zeros; and further detecting the number of trailing zeros of the least significant bits stored in the first 8-bit register.

7. A method of detecting a data structure of data in an optical storage device, the method comprising:
   providing a second 8-bit register connected between an eight-to-fourteen modulator and a trailing zero counter;
   storing the 8 most significant bits of data output from the eight-to-fourteen modulator in the second 8-bit register;
   calculating a number of trailing zeros stored in the second 8-bit register with the trailing zero counter;
   generating merging bits according to the number of trailing zeros to thereby keep an average potential of the bits of data output from the eight-to-fourteen modulator near a DC potential;
   inserting the generated merging bits between former 14-bit data and latter 14-bit data; and
   utilizing the optical storage device to write the former 14-bit data, the inserted merging bits, and the latter 14-bit data to the optical disc.

8. The method of claim 7 further comprising:
   detecting the number of trailing zeros of the most significant bits stored in the second 8-bit register, if the most significant bits stored in the second 8-bit register are zeros; and further detecting the number of trailing zeros of the least significant bits stored in the second 8-bit register.

9. The method of claim 7 further comprising:
   providing a first 8-bit register connected between the eight-to-fourteen modulator and a leading zero counter;
   storing the 8 least significant bits of the data output from the eight-to-fourteen modulator in the first 8-bit register; and
   calculating a number of leading zeros stored in the first 8-bit register with the leading zero counter.

10. The method of claim 9 further comprising:
    detecting the number of leading zeros of the least significant bits stored in the first 8-bit register, if the least significant bits stored in the first 8-bit register are zeros; and further detecting the number of leading zeros of the most significant bits stored in the first 8-bit register.

11. The method of claim 7 further comprising:
    connecting the second 8-bit register between the eight-to-fourteen modulator and a leading zero counter;

storing the 8 least significant bits of the data output from the eight-to-fourteen modulator in the second 8-bit register; and calculating a number of leading zeros stored in the second 8-bit register with the leading zero counter.

12. The method of claim 11 further comprising:

detecting the number of leading zeros of the least significant bits stored in the second 8-bit register, if the least significant bits stored in the second 8-bit register are zeros; and further detecting the number of leading zeros of the most significant bits stored in the second 8-bit register.

13. An optical storage device for processing recovered data comprising:

an eight-to-fourteen modulator;

a first 8-bit register connected to the eight-to-fourteen modulator for storing 8 least significant bits of data output from the eight-to-fourteen modulator; and a leading zero counter connected to the first 8-bit register for calculating a number of leading zeros stored in the first 8-bit register;

wherein the optical storage device is for generating merging bits according to the number of leading zeros to thereby keep an average potential of the bits of data output from the eight-to-fourteen modulator near a DC potential.

14. The optical storage device of claim 13 wherein the leading zero counter is further for detecting the number of leading zeros of the least significant bits stored in the first 8-bit register, if the least significant bits stored in the first 8-bit register are zeros; and further for detecting the number of leading zeros of the most significant bits stored in the first 8-bit register.

15. The optical storage device of claim 13 further comprising: a second 8-bit register connected to the eight-to-fourteen modulator for storing 8 most significant bits of the data output from the eight-to-fourteen modulator; and a trailing zero counter connected to the second 8-bit register for calculating a number of trailing zeros stored in the second 8-bit register.

16. The optical storage device of claim 15 wherein the trailing zero counter is further for detecting the number of trailing zeros of the most significant bits stored in the second 8-bit register, if the most significant bits stored in the second 8-bit register are zeros; and further for detecting the number of trailing zeros of the least significant bits stored in the first 8-bit register.

17. The optical storage device of claim 13 further comprising:

a trailing zero counter connected to the first 8-bit register, the first 8-bit register for storing 8 most significant bits of the data output from the eight-to-fourteen modulator, and the trailing zero counter for calculating a number of trailing zeros stored in the first 8-bit register.

18. The optical storage device of claim 17 wherein the trailing zero counter is further for detecting the number of trailing zeros of the most significant bits stored in the first 8-bit register, if the most significant bits stored in the first 8-bit register are zeros; and further for detecting the number of trailing zeros of the least significant bits stored in the first 8-bit register.

19. An optical storage device for processing recovered data comprising:

an eight-to-fourteen modulator;

a second 8-bit register coupled to the eight-to-fourteen modulator for storing 8 most significant bits of data output from the eight-to-fourteen modulator; and a trailing zero counter for calculating a number of trailing zeros stored in the second 8-bit register;

wherein the optical storage device is for generating merging bits according to the number of trailing zeros to thereby keep an average potential of the bits of data output from the eight-to-fourteen modulator near a DC potential.

20. The optical storage device of claim 19 wherein the trailing zero counter is further for detecting the number of trailing zeros of the most significant bits stored in the second 8-bit register, if the most significant bits stored in the second 8-bit register are zeros; and further detecting the number of trailing zeros of the least significant bits stored in the second 8-bit register.

21. The optical storage device of claim 19 further comprising:

a first 8-bit register connected to the eight-to-fourteen modulator for storing 8 least significant bits of the data output from the eight-to-fourteen modulator; and a leading zero counter for calculating a number of leading zeros stored in the first 8-bit register.

22. The optical storage device of claim 21 wherein the leading zero counter is further for detecting the number of leading zeros of the least significant bits stored in the first 8-bit register, if the least significant bits stored in the first 8-bit register are zeros; and further for detecting the number of leading zeros of the most significant bits stored in the first 8-bit register.

23. The optical storage device of claim 19 further comprising:

a leading zero counter connected to the second 8-bit register, the second 8-bit counter for storing 8 least significant bits of the data output from the eight-to-fourteen modulator in the second 8-bit register, and the leading zero counter for calculating a number of leading zeros stored in the second 8-bit register.

24. The optical storage device of claim 23 wherein the leading zero counter is further for detecting the number of leading zeros of the least significant bits stored in the second 8-bit register, if the least significant bits stored in the second 8-bit register are zeros; and further for detecting the number of leading zeros of the most significant bits stored in the second 8-bit register.

* * * * *